United States Patent [19]

Müller et al.

[11] Patent Number: 5,361,850
[45] Date of Patent: Nov. 8, 1994

[54] SIDE STRUT FOR THE LOWER STEERING ARM OF A THREE-POINT HITCH

[75] Inventors: Norbert Müller, Ruppichteroth; Jügen Vollmer, Lohmar; Paul Herchenbach, Ruppichteroth, all of Germany

[73] Assignee: Jean Walterscheid GmbH, Lohmar, Germany

[21] Appl. No.: 894,106

[22] Filed: Jun. 5, 1992

[30] Foreign Application Priority Data

Jun. 7, 1991 [DE] Germany .............................. 4118683

[51] Int. Cl.$^5$ .......................................... A01B 59/041
[52] U.S. Cl. ................... 172/450; 292/278; 403/378; 280/455.1; 172/439
[58] Field of Search ............... 172/450, 47, 272, 275, 172/439, 443; 280/455.1, 474, 460.1; 403/377, 379, 327, 330, 378; 74/586; 37/231; 285/303; 292/262, 278, 338, 339

[56] References Cited

U.S. PATENT DOCUMENTS

| | | | |
|---|---|---|---|
| 2,677,565 | 5/1954 | Loomis | 292/278 |
| 3,434,737 | 3/1969 | Bailey . | |
| 3,446,518 | 5/1969 | Dodgson et al. | 285/303 |
| 3,526,040 | 9/1970 | Young | 403/330 |
| 4,078,779 | 3/1978 | Mölders | 292/378 |
| 4,194,757 | 3/1980 | Lucas et al. | 172/439 |
| 4,456,291 | 6/1984 | Brogie | 292/338 |
| 4,862,971 | 9/1989 | Azzarello et al. | 172/450 |
| 4,925,230 | 5/1990 | Shelton | 292/338 |

FOREIGN PATENT DOCUMENTS

| | | | |
|---|---|---|---|
| 1517568 | 3/1968 | France . | |
| 2223888 | 12/1973 | Germany | 172/450 |
| 2727131 | 12/1978 | Germany | 172/450 |
| 2103064 | 2/1983 | United Kingdom | 172/450 |

*Primary Examiner*—Randolph A. Reese
*Assistant Examiner*—Spencer Warnick
*Attorney, Agent, or Firm*—Harness, Dickey & Pierce

[57] ABSTRACT

The invention relates to a side strut (6) for the lower steering arm of a three-point hitch of a tractor. Locking catches (24, 25) are provided to cancel the floating position which the two telescopic members (14, 15) of the side strut 6 may assume relative to each other. The catches (24, 25) lock the members via locking contours (29, 30) of a locking recess 28, which surround and secure to a locking journal (31). The two locking catches (24, 25) are arranged at the sides of the telescopic members (14, 15). The locking catches have their pivot axis of the articulated journal (27) the points of contact between the locking contours (29, 30) and the locking journals (31), in a locked position, positioned on a connecting line. The line extends parallel to the sliding axis (16) and through the pivot axis of the ball eye (13). In this way, it is ensured that the locking catches (24, 25) and also the side strut (6), together, are not subject to any bending moments resulting from any tensile or compressive forces.

10 Claims, 2 Drawing Sheets

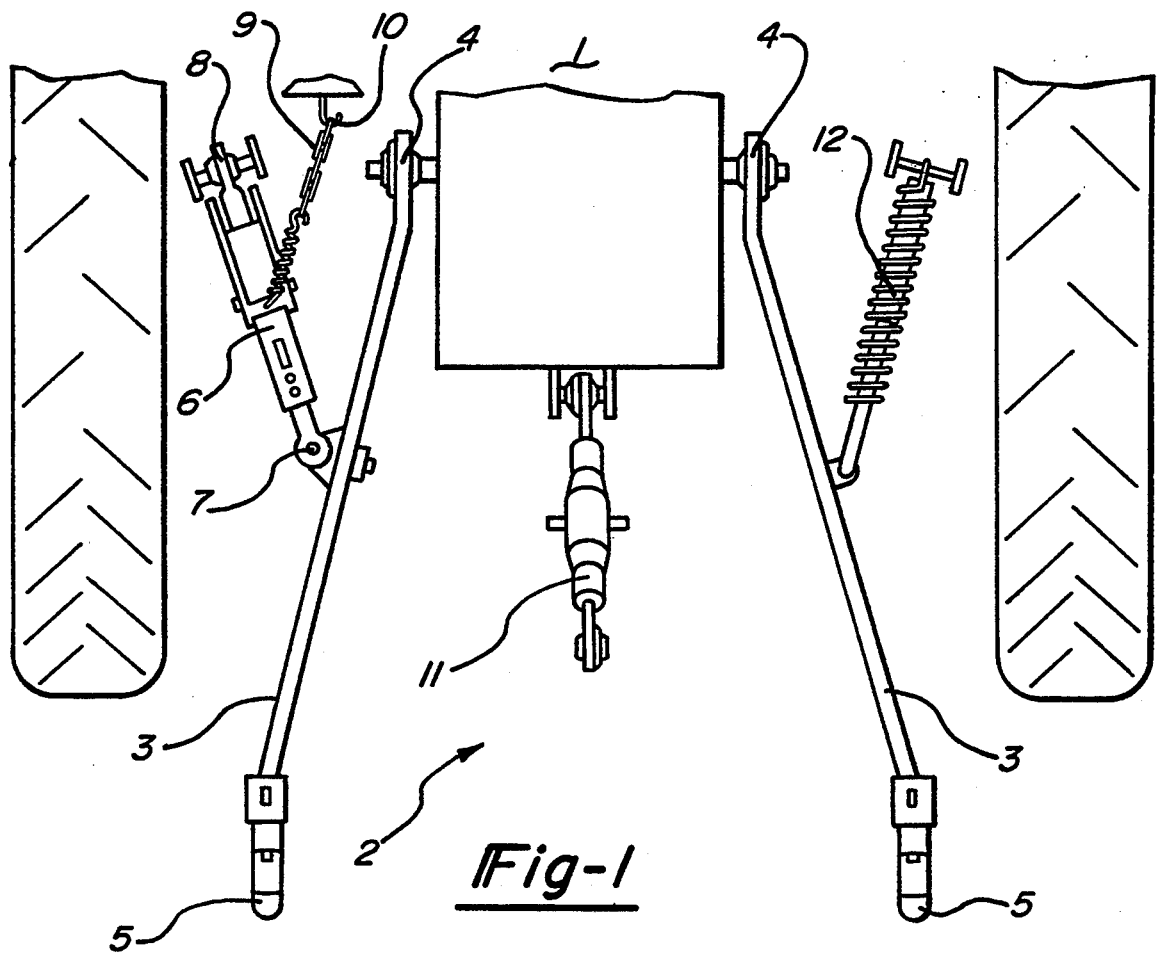
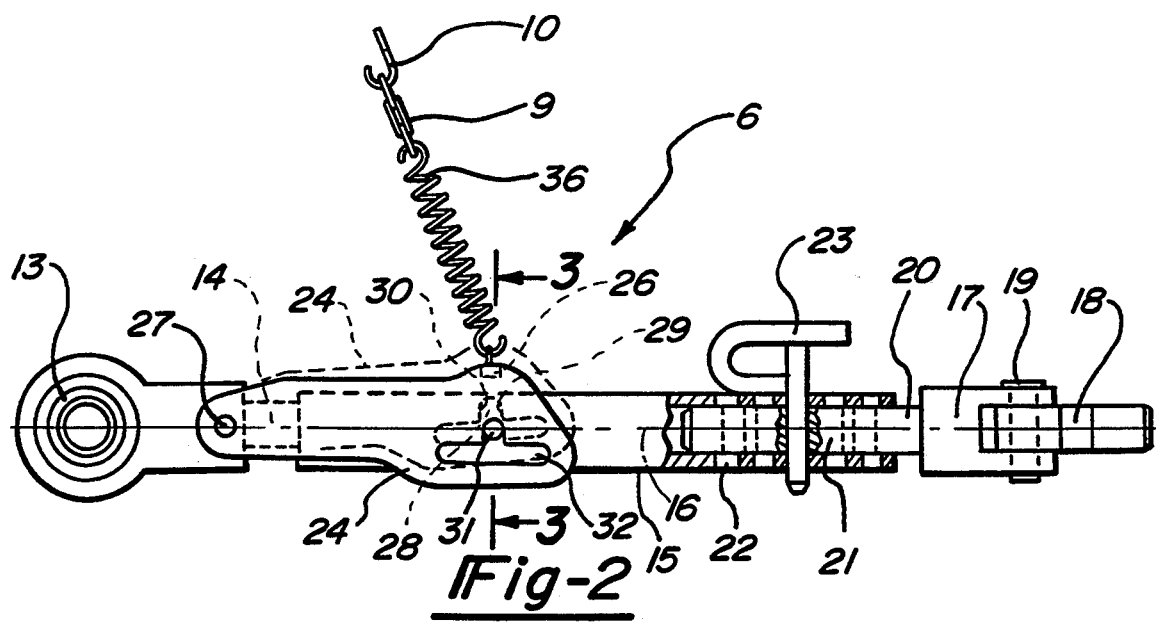

SIDE STRUT FOR THE LOWER STEERING ARM OF A THREE-POINT HITCH

BACKGROUND OF THE INVENTION

The invention relates to a side strut for a lower steering arm of a three-point hitch of a tractor. The side strut has a first telescopic member pivotably secured to the tractor and a second telescopic member pivotably secured to the lower steering arm. The telescopic members are suitable for telescopic movement relative to each other along a sliding axis. The telescopic action is cancelled by locking a blocking element, which are pivotably connected to one of the telescopic members, interlocking with a locking element securely coupled to the other telescopic member. The two telescopic members are arranged between two blocking element cheeks which extend parallel to each other and to the sliding axis.

A side strut is known from DE-PS 27 27 131 which illustrates a locking element designed as a double bracket. The double bracket is pivotable around an axis which is offset relative to the sliding axis of the telescopic members. The locking engagement of the engaging catch between the spaced stops is also offset relative to the sliding axis. Furthermore, the pivot axis and the engaging stops are offset by different dimensions. As a result, additional bending moments occur if a tensile or compressive load is applied on the telescoped members in the direction of the sliding axis. On the one hand, these bending moments have to be accommodated by the locking element itself, and on the other hand, by the guiding means of the telescopic members movable relative to each other.

It is an object of the invention to provide a side strut where the bending moments resulting from tensile and compressive loads are reduced to a minimum.

SUMMARY OF THE INVENTION

In accordance with the invention, the objective is achieved by designing both cheeks as locking catches whose pivot axis intersects the sliding axis of the telescopic members. Also, the locking contours of the locking catches and the locking contour of the locking element, in the locking condition, contact one another on an operating line extending through the pivot axis and parallel to the sliding axis.

The advantage of this design is a greatly reduced bending moment per load direction. The reduction is largely due to the small amount of eccentricity of the locking catches relative to the sliding axis. If the locking mechanism is such that both locking catches become active, both in the tensile and compressive direction, there are no bending moments. This makes it possible to provide a lightweight design for the locking catches and the side strut. Furthermore, the guiding means of the telescopic members cannot bend relative to each other. Even if the two telescopic members are designed to be relatively lightweight, the telescopic action is satisfactory.

In a further embodiment of the invention, the two locking catches are arranged so as to be pivotable independently of each other. By arranging the two locking catches to be pivotable independently of each other, secure engagement and thus locking is achieved in all operating conditions. However, it is also possible to connect the two locking catches by a bridge in which the two catches can only be moved jointly.

According to a preferred embodiment, it is proposed that the locking elements be designed as locking journals. The journals project in opposite directions from one of the telescopic members and extend radially relative to the sliding axis. The locking catches each include a locking recess with the locking contour extending at right angles relative to the sliding axis. To lock the telescopic members in both telescoping directions, the locking recess, which is designed as a slot, extends over the locking journal in a form-fitting way. In consequence, the locking effect is achieved in both the compressive and in the tensile direction. Both locking catches participate in the load in the tensile and compressive direction.

Alternatively, it is also possible to provide the two locking catches with locking recesses. Each recess has a locking contour which acts in an opposite telescoping direction. The advantage of this design is that when loads are applied, jamming is substantially eliminated. Furthermore, secure engagement occurs which ensures locking of the two telescopic members relative to each other. This solution allows the side strut to move freely in one direction if only one of the two locking catches is moved into its operating or locking position.

According to a further characteristic of the invention, the locking recesses each run into a longitudinal slot of the locking catches which limit the telescopic movement of the telescopic members relative to each other. Furthermore, the parts are prevented from falling apart.

When the locking catches are moved into the locking position and to facilitate engagement of the locking journal, the locking recess should pass through the longitudinal slot, via inclined running-in faces. And if the two locking catches are to become active in different directions, e.g. one in the tensile and one in the compressive direction, the inclined running-in face should start from the longitudinal slot from the side extending towards the locking contour.

To facilitate engagement of the two locking catches, it is possible for the locking recesses to be extended step-like and pass into the longitudinal slot. To hold the locking catches in the open position, in order to ensure free telescopic movement of the telescopic members relative to each other, the locking catches are each held and loaded in the direction of the open position by a spring and a tensioning member.

If the two locking catches are to be moved jointly or are connected via a bridge, the unit may be provided with only one spring. The purpose of the spring is to compensate for the lifting movement carried out jointly by the side strut and the associated lower steering arm. Furthermore, the spring ensures that in all positions in which the lower steering arm is to assume for the floating position, the locking catches remain in the lifted position. The tension spring is followed by a tensioning member, for example a chain. Taking into account the raised positions to be assumed by the lower steering arm, the chain may be suspended on a holding device at the tractor rear end when the side strut is in the unlocked position.

From the following detailed description taken in conjunction with the accompanying drawings and subjoined claims, other objects and advantages of the present invention will become apparent to those skilled in the art.

BRIEF DESCRIPTION OF THE DRAWINGS

Preferred embodiments of the invention as well as a side strut designed in accordance with the invention and arranged with a tractor are diagrammatically illustrated in the drawing wherein:

FIG. 1 is a plan view of the rear of a tractor having a three-point hitch with a side strut.

FIG. 2 is a side view, partially in section, of a side strut in accordance with the invention.

DETAILED DESCRIPTION OF THE PREFERRED EMBODIMENTS

Figure 3:
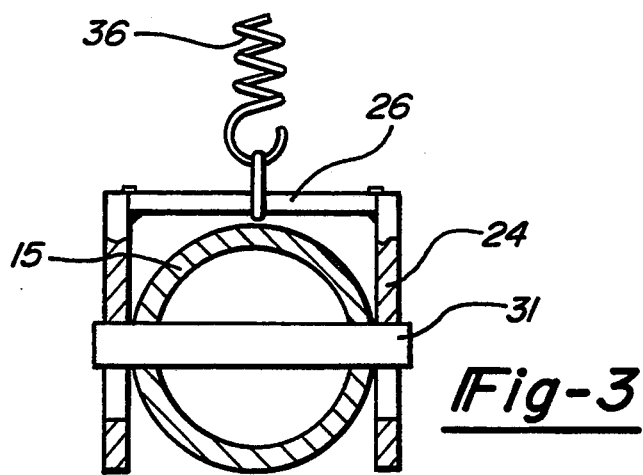
FIG. 3 is a sectional view of FIG. 2 through line 2—2 thereof.

The rear of the tractor 1, according to FIG. 1, is provided with a three-point hitch 2. The hitch, towards the ground, includes two lower steering arms 3 which are pivotably secured around articulation points or pins 4. The free ends of the two lower steering arms 3 include coupling hooks 5. The hooks 5 are adapted to receive the connecting journal or catching ball of an implement to be connected with the tractor.

One of the two lower steering arms 3 is supported relative to the tractor 1 via a side strut 6. The side strut 6 is pivotably secured at an articulation point or pins 8. The articulation point 8 is positioned about an axis along the extension of an axis through the two articulation points 4. The other end of the side strut 6 is pivotably connected to the associated lower steering arm 3 via the articulation point or pin 7 as seen in FIG. 1. The articulation axis of articulation point 7 is offset 90° relative to the articulation point 8. This offset enables the side strut 6 to participate in the upward pivoting movements of the lower steering arm 3 about the articulation point 4 and in lateral pendulum movements of the lower steering arm 3.

The side strut 6 is designed as a telescopic strut whose telescopic action may be blocked. When the telescopic action is blocked, the side strut 6 holds the lower steering arm 3 and prevents it from carrying out lateral pendulum movements. In turn, the implement attached to the three-point hitch does not carry out any pendulum movements. Such rigid lateral guidance is desirable in the case of accurately guided implements. For instance, when working rows of vegetation by using hoeing implements or the like, it is desirable to prevent lateral pendulum movement. Furthermore, a locked position is required when the implements are in a lifted condition, e.g. in the transport position. The strut helps to avoid lateral swinging of the implement which would otherwise influence the driving behavior of the tractor 1. Also, the strut helps to prevent the lower steering arms from catching the rear wheel tires.

In cases where an implement is held in the coupling hooks, the second lower steering arm 3 is held accordingly due to the fixed distance between the two lower steering arms 3. The second lower steering arm is associated with a side stabilizer 12 which, similarly to the side strut, is secured to the lower steering arm 3 and the tractor 1. The purpose of the side stabilizer 12 is merely to secure a preferential position, dampen vibrations and permit resilient movability. The stabilizer spring ensures return to a starting position, for instance when the side strut is in a floating position so that telescopic action is possible. Such a floating position has to be selected, for example, in the case of implements guided by the ground such as plows.

The three-point hitch 2 also has an upper steering arm 11. Arm 11 is pivotably secured to the rear of the tractor 1 and is adapted to be connected to the upper articulation point of an implement.

The design of the side strut 6 and the way in which the telescopic members are locked are described in greater detail with reference to FIGS. 2 to 5.

The ends of the side strut 6 illustrated in FIGS. 2 and 3 include two connecting elements 13 and 17 which are secured to the lower steering arm 3 and tractor 1, respectively. To enable attachment to tractor articulation point 8, there is provided a ball eye 13 which enables rotational movement and limited pivoting movement in all directions. The inner telescopic member 14 extends from the ball eye 13 and is securely attached thereto. The member 14 adjustably guides the outer telescopic member 15 in the direction of the sliding axis 16. The outer telescopic member 15 is designed as a sleeve. At the end of the member 15, positioned away from the ball eye 13, a plurality of plug-in bores 22 are spaced along and transverse to the sliding axis 16. The sliding journal 20, which is also provided with plug-in bores 21, extends into the central axial bore of the outer telescopic member 15. The plug-in pin 23 is plugged into one of plug-in bores 21 of the sliding journal and a corresponding bore of the plug-in bores 22 of the outer telescopic member to secure the outer telescopic member 15 relative to the sliding journal 20. The sliding journal 20 is followed by the yoke head 17. The yoke head 17 has a connecting journal 18 pivotally secured thereto by an articulated pin 19. Via the connecting journal 18, the side strut 6 is secured in the articulation point 7 to the lower steering arm 3, as illustrated in FIG. 1. It can be seen that the pivot axis of the ball eye 13 extends perpendicularly relative to the pivot axis of the yoke head 13, 17 passing through the articulated pin 19. The ball eye 13 enables the side strut 6 to pivot in the plane of the drawing, whereas the yoke head 17 enables the side strut 6 to pivot out of the plane of the drawing.

A locking mechanism is provided to prevent the free telescopic action of the inner telescopic member 14 relative to the outer telescopic member 15. This locking mechanism includes two locking catches 24, 25 which are arranged at the sides of the telescopic members 14, 15. The catches 24, 25 are pivotable jointly around laterally projecting articulated journals 27 of the ball eye 13. The two locking catches 24, 25 may be connected to each other via a bridge 26 so that they may only be pivoted jointly.

The two locking catches each include a longitudinal slot 32 with an upwardly extending locking recess 28. In the locking position, e.g. the position of the locking catches 24, 25 shown in continuous lines in FIG. 2, the locking recess 28 receives the locking journal 31. The journal 31 is associated with the respective locking catch 24, 25 and is radially secured to the outer telescopic member 15. It can be seen that both the articulated pin 27 and the locking journal 31 are arranged on a connecting line which extends parallel to the sliding axis 16. Towards the two sliding directions, the locking recess 28 has locking contours 29, 30. The locking contours 30 prevent the telescopic action of the two telescopic members 14, 15 in the sense of having a shortening effect, e.g. they support any compressive loads. By resting against the locking journals 31, the two locking contours 29 prevent an extension of the side strut 6, e.g. they accommodate tensile forces acting on the two connecting ends. The two longitudinal slots 32 in the two locking catches 24, 25 limit the sliding movement of the telescopic members 14, 15 relative to each other in the floating position. In connection with the plug-in bores 21, 22 and plug-in pin 23, the sliding journal 20 serves to set the basic length of the side strut 6 for a particular application, with reference to the distance between the two lower steering arms 3 of the tractor 1.

The two locking catches 24, 25 are jointly connected to a spring 36 which engages the free end of the locking catches 24, 25 as seen in FIG. 2. The spring 36, in turn, is connected to a tensioning member 9 which may be operated by the tractor driver. The member 9 may be suspended in a holding device 10 secured to the tractor 1. The length of the tensioning member 9 may be adjusted when suspending it so that while the lower steering arms 3 are lifted and lowered, a tensile force is always applied to the locking catches 24, 25 via the spring 36. The force of the spring holds the side strut in the released position as illustrated in FIG. 2. In view of the dimensions of the longitudinal slot 32, an axial adjustment of the two telescopic members 14, 15 relative to each other is possible. During adjusting, the locking pin 31 is positioned in the longitudinal slot 32 of the two locking catches 24, 25.

Figure 4:
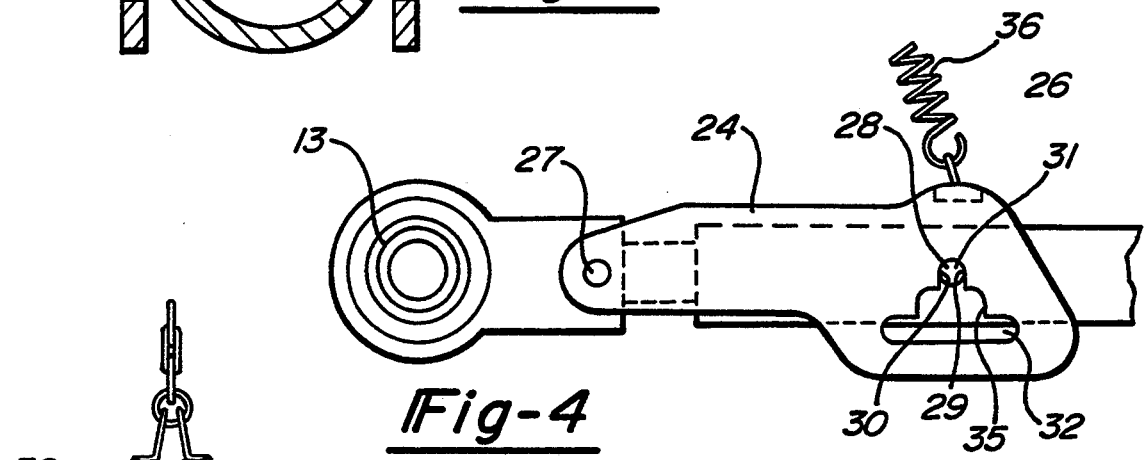
FIG. 4 is a side view of a portion of a strut with a modified embodiment of the locking catches.

In the case of the embodiments according to FIGS. 2 to 4, the two locking catches 24, 25 are connected to each other via a bridge 26. In these embodiments, both locking catches accommodate both compressive and tensile forces acting on the connections of the side strut 6.

The embodiment illustrated in FIG. 4 deviates from that shown in FIG. 2 in that an extension step 35 is provided between the locking recess 28, with the locking contours 29, 30, and the slot 32. The step 35 facilitates the transfer of the locking catches 24, 25 from the released position into the locked position shown in FIG. 4. When the locking catches 24, 25 are transferred into the locked position, under the influence of their own weight, they have to take advantage of the coinciding positions which happen to occur during the telescopic movement in order to achieve engagement of the locking recess 28 via the locking journal 31.

Figure 5C:
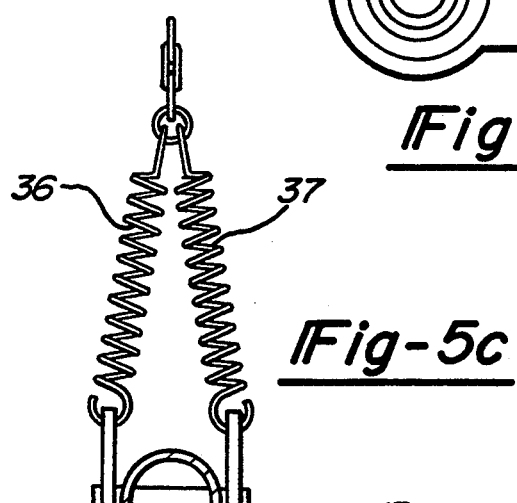
FIG. 5c is a view of 5a along line 5c—5c thereof.
Figure 5A:
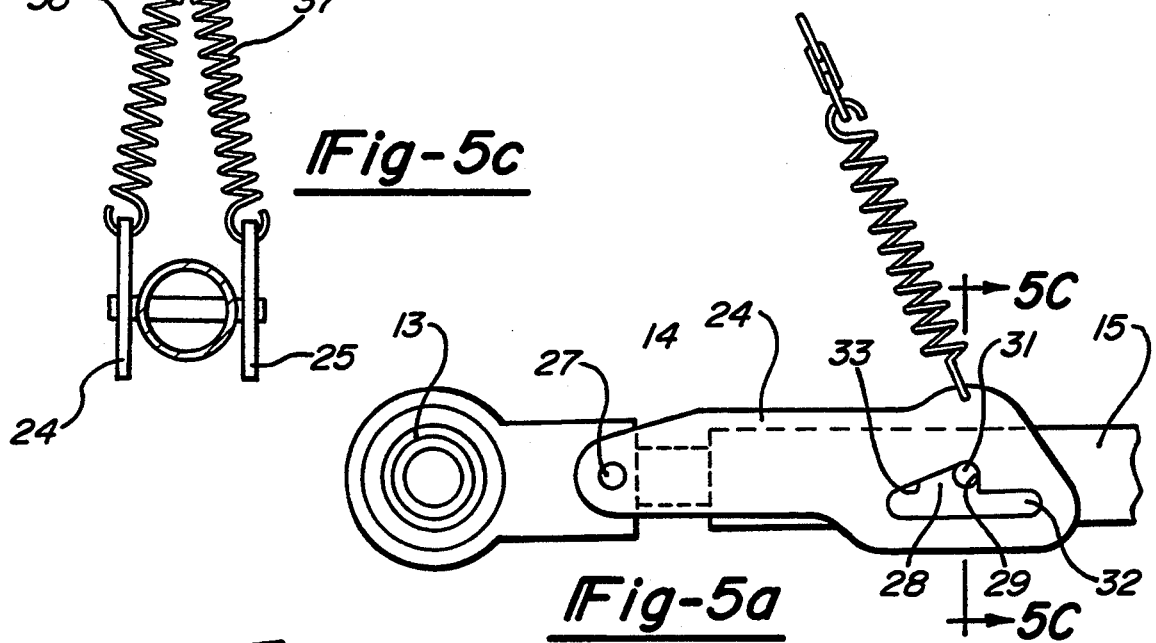
FIG. 5a is a side view of another modified embodiment of a side strut with one of the locking catches illustrated in the locked position.
Figure 5B:
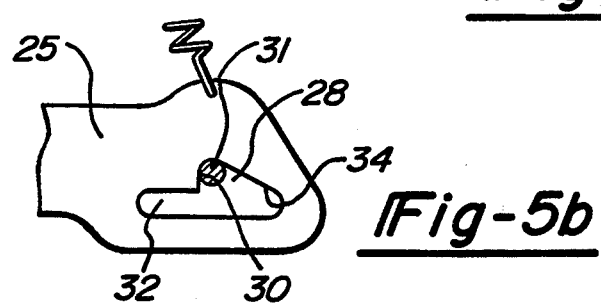
FIG. 5b is like FIG. 5a illustrating the other catch.

In the case of the embodiment of FIGS. 5a through 5c, the locking catch 25 accommodates only compressive loads whereas the locking catch 24 accommodates only tensile loads. An inclined running-in face 33, 34 is provided between the longitudinal slot 32 and the locking recess 28. In the case of the locking catch 24 accommodating tensile forces, FIG. 5a, the inclined running-in face 33, starting from the longitudinal slot 32, points to the locking contour 29 accommodating tensile forces. However, in the case of the locking catch 25, the running-in face 34, starting from the longitudinal slot 32, is arranged towards the locking contour 30 accommodating compressive forces. The inclined running-in faces 33, 34 simplify the transfer of the locking catches 24, 25 into the locking position. Both locking catches 24, 25 are adjustable via a joint tension spring 36, as explained in connection with FIGS. 2 to 4. However, in the case of the embodiment as shown in FIG. 5c, it is also possible to load each of the locking catches 24, 25 by a spring 36, 37. Equally, it is possible to provide independent tension members to achieve a further locking variant where both locking catches 24, 25 may be actuated jointly or independently. In the case of this variant, it is possible, for example, to transfer the locking catch 24 into the open position by applying a force to the tension member loading the spring 36. The force causes the locking catch 24 to pivot upwards about the articulated journal 27 so that, with reference to the locking catch 24, the locking journal 31 is positioned in the longitudinal slot 32. In consequence, the locking catch 24 would permit an extended position, whereas the engaged locking catch 25, via its locking contour 30, prevents the side strut 6 from being shortened, e.g. it prevents the two telescopic members 14, 15 from being inserted, but on the other hand, it permits an extension as a result of the inclined running-in face 34, which is not prevented from movement by the locking catch 24.

While the above detailed description describes the preferred embodiment of the present invention, the invention is susceptible to modification, variation, and alteration without deviating from the scope and fair meaning of the subjoined claims.

What is claimed is:

1. A side strut for the lower steering arm of a three-point hitch of a tractor, comprising:
   a first telescopic member having a pivot axis and adapted to be pivotably secured to the tractor about the pivot axis;
   a second telescopic member adapted to be pivotably secured to the lower steering arm, the telescopic members being suitable for telescopic movement relative to each other along a sliding axis;
   a locking mechanism for prohibiting said telescopic movement, said mechanism including a pair of locking catches pivotally coupled with said first telescopic member about a pivot axis distinct from said first telescopic member pivot axis, each locking catch having a locking recess for receiving a locking element, said locking elements extending in opposite directions from the second telescopic member and extending radially relative to the sliding axis, and said locking catches pivot axis, locking recess and locking element, in a locked condition, being located on a line extending through the first telescopic member's pivot axis and parallel to the sliding axis such that the locking catches and strut are substantially prohibited from bending moments and each said locking recess including at least one locking contour, said locking recesses each run into a longitudinal slot of the locking catches, said slot limits the telescoping movement of the telescopic members relative to each other.

2. A side strut according to claim 1, wherein said locking catches are arranged so as to be pivotable independently of each other.

3. A side strut according to claim 1, wherein said locking elements are designed as locking journals and each said locking recess includes a pair of locking contours.

4. A side strut according to claim 3, wherein said locking contours extend at right angles relative to the sliding axis.

5. A side strut according to claim 3, wherein for locking the telescopic members in both telescoping directions, the locking recess is designed as a slot which fits over the locking journal.

6. A side strut according to claim 1, wherein said locking recesses, via an inclined running-in face, pass into the longitudinal slot.

7. A side strut according to claim 6, wherein said inclined running-in face starts from the longitudinal slot from the side extending towards the locking contour.

8. A side strut according to claim 1, wherein the locking recesses have a step-like extension and pass into the longitudinal slot in this condition.

9. A side strut according to claim 1, wherein said locking catches are each held and loaded in the direction of an open position by a spring and a tensioning member.

10. The side strut according to claim 2, wherein said locking contours face in opposing telescoping directions.

* * * * *